Nov. 7, 1961　　　R. T. BURNETT　　　3,007,548
MOUNTING FOR BRAKE

Filed Aug. 30, 1955　　　2 Sheets-Sheet 1

INVENTOR.
RICHARD T. BURNETT.
BY
John A. Young
ATTORNEY.

Nov. 7, 1961 R. T. BURNETT 3,007,548
MOUNTING FOR BRAKE
Filed Aug. 30, 1955 2 Sheets-Sheet 2

INVENTOR.
RICHARD T. BURNETT.
BY John A. Young
ATTORNEY.

United States Patent Office 3,007,548
Patented Nov. 7, 1961

3,007,548
MOUNTING FOR BRAKE
Richard T. Burnett, South Bend, Ind., assignor to The Bendix Corporation, a corporation of Delaware
Filed Aug. 30, 1955, Ser. No. 531,551
3 Claims. (Cl. 188—78)

This invention relates generally to kinetic-energy-absorbing devices such as brakes and more specifically to means for supporting and locating various components of the device.

It is often expedient for the vehicle manufacturer to reduce the size of the cavity wherein the brake is located. One of the reasons for this is that the wheel can be thus arranged as closely as possible to the bearing whereon it is mounted. By reducing the displacement between the bearing and the mounting for the wheel it is possible to reduce offset loading on the axle or axle housing.

Spacing between the wheel and the vehicle often becomes so critical that the size of the brake is dictated by this factor rather than actual vehicle requirements. Space allotment and brake size are often competing design considerations so that the compromised result does not always include an optimum size brake.

It is an object of the invention to devise new construction principles to enable fitting a brake within smaller lateral space than heretofore possible.

It is a further object of the invention to displace the rotor farther from the wheel to provide a larger air gap therebetween so that the rotor might be cooled more efficiently.

A further object of the invention is to obtain a reduction in space between the wheel and the bearing without substantial decrease in either the available friction-element-engaging surfaces of the rotor or the size of the brake.

A further object of the invention is to provide new and different mounting means for the friction units associated with a rotor which enable proper positioning of the units relatively to the drum.

Figure 1:
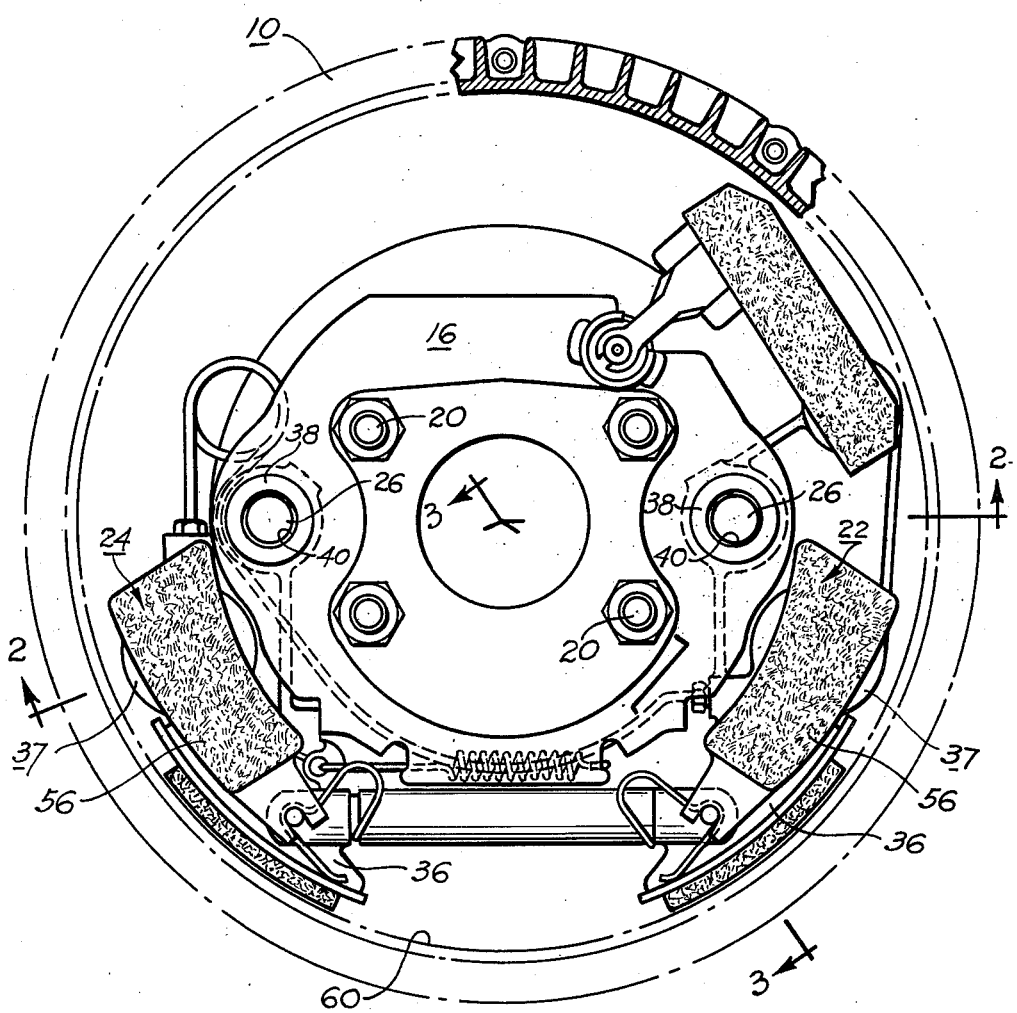
Figure 2:
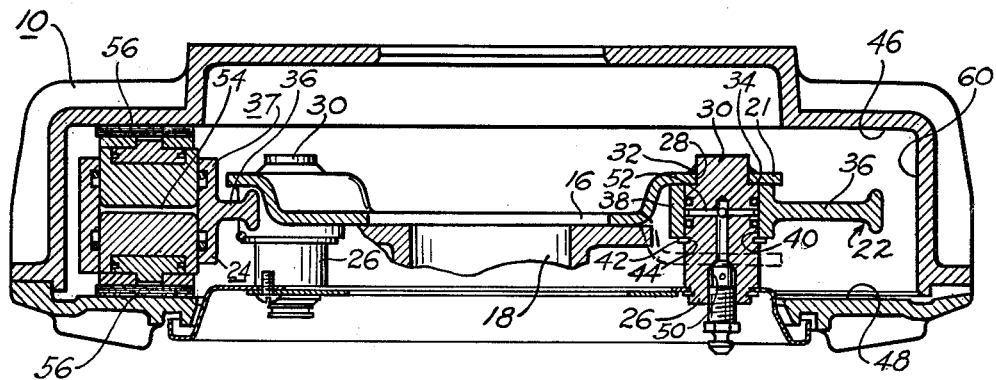
Figure 3:
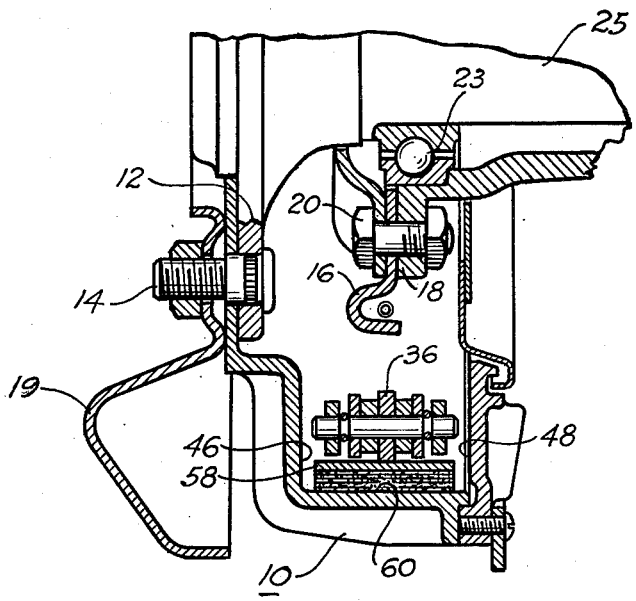

Other objects and features of the invention will become apparent from a consideration of the following description which proceeds with reference to the accompanying drawings, wherein:

FIGURE 1 is a side elevation view of a rear wheel brake incorporating the invention therein; and FIGURES 2 and 3 are section views taken on the corresponding lines in FIGURE 1.

Referring to FIGURES 1 and 2, a U-shaped cross section rotor 10 is secured to an axle flange 12 (FIGURE 3) by means of bolts or the like 14. Torque plate 16 is secured to a fixed axle housing flange 18 in any suitable manner as, for example, by bolts, rivets, or the like 20.

Wheel mounting structure 19 is also secured to the rotatable axle flange by the bolts 14. Roller bearings 23 permit turning of the wheel on shaft 25.

The periphery of the torque plate 16 may be contoured in various directions as required. A peripheral mounting segment 21 (FIGURE 2) is laterally offset toward the outboard side of the brake, that is, the side of the brake adjacent the vehicle wheel. The mounting segment 21 is displaced from the mounting flange 18 and the central portion of the torque plate 16.

There are two laterally offset mounting segments 21 one for each of the friction units 22 and 24. An anchor post 26 is provided for each of the friction units. The anchor posts 26 extend through openings 28 in mounting segments 21 of the torque plate, with ends 30 (FIGURE 2) projecting slightly beyond the torque plate. A weld 32 is used to hold the anchor in place and stiffen its operative position.

Shoulder 34 bears against the opposite side of the torque plate to further assist in locating and holding the anchor in place. It will thus be seen that the anchor posts are rigidly secured to the torque plate 16.

In previous brake constructions, the anchor was secured to the torque plate and projected toward the outboard side of the brake. This is to be contrasted with the construction shown in FIGURE 2.

Each of the friction units 37 is provided with a web 36 having a boss 38 at the one side thereof which serves to mount the unit. Boss 38 is constructed with an opening 40 which receives the anchor 26 therethrough. A retaining ring 42 is fitted into a groove 44 in the anchor post and bears against one side of the boss 38 to urge the opposite side against the torque plate 16 (FIGURE 2). The friction unit is thus held against the torque plate and its lateral position is defined. The friction unit is free to turn on the associated anchor post; the boss 38 serves as bearing for this pivotal movement.

It will be noted in FIGURE 2 that the anchor post 26 is fitted at one end to the torque plate 16 and extends therefrom toward the inboard side of the brake. The mounting segment 21 of the torque plate may be laterally offset with respect to flange 18 in either direction to locate the friction unit in any desired lateral position. The friction unit may be thus centralized between the sides of the U-shaped cross section rotor 10. That is, the segment 21 and flange 18 may be relatively located to permit desired positioning of the unit 22 with respect to sides 46 and 48 of the rotor.

The anchor posts are constructed with longitudinal passages 50 terminating in radial bores 52 which lead to a fluid motor 54. The fluid motor 54 in each friction unit is used to spread apart two associated flat "disk" friction elements 56 so that they forcibly engage the sides 46 and 48 of the rotor. The engagement of the disk friction elements with the sides 46 and 48 of the rotor produces a turning of the unit on anchor post 26, thus applying arcuate "shoe" friction element 58 against cylindrical surface 60 of the rotor.

The proper lateral location of the friction unit is of utmost importance. It is necessary that the "disk" elements 56 be approximately the same distance from the engageable side 46 or 48 of the rotor. It is also necessary that the arcuate "shoe" segment be located about midway between the sides 46 and 48, concentric with surface 60 of the rotor.

In previous brake designs, it was generally provided that segment 21 would be laterally offset toward the inboard instead of the outboard side of the brake. The anchor post 26 would then project from the torque plate 16 toward the outboard side of the brake and the friction unit 22 would be mounted on the side of the torque plate opposite that shown in FIGURE 2. With this previous arrangement, it was necessary to locate the rotor farther away from the flange 18, the net result being a greater displacement between the mounting flange 12 for the rotor and the stationary mounting flange 18 for the torque plate 16. As explained previously, the greater the distance between the respective flanges 12 and 18, the greater will be the amount of offset loading on the bearing for the wheel.

The lateral position of the rotor is dictated by the lateral position of the friction unit. If it is desired, therefore, to dispose the rotor in a selected lateral location relative to the flange 18, it is first necessary to establish some means for locating the friction unit relative to the flange 18. In the previously proposed methods of mounting the unit, it was necessary to form the torque plate around its mounting flange with sharp offsets which are highly undesirable from both a manufacturing and performance standpoint.

Another advantage of the invention is that the rotor 10 may be displaced farther toward the inboard side of the vehicle in order to establish a greater clearance between the rotor and the wheel. Referring to FIGURE 3, note the displacement between the rotor and the hub of the wheel. Since it is possible by the mounting arrangement of the present invention, to locate the brake closer to the mounting flange 18, it is correspondingly possible to move the rotor through a like distance closer to the flange 18 to thereby situate the rotor farther away from the hub and increase the displacement. It has been my experience, that the larger the gap between the wheel hub and the rotor, the greater is the air stream which circulates around the rotor to promote cooling. As a direct result, therefore, of the improved mounting means, it is possible to improve the efficiency in cooling the brake with the result that adverse thermal effects on braking are greatly reduced. The invention is not only significant for those situations demanding smaller cavities for mounting the brake, but also the invention is useful in promoting a more efficient air circulation to cool the brake.

Although the invention is described with reference to a single selected embodiment, it will be understood that this is merely to illustrate the principles thereof. It is not to be construed that the example structure is limitative of the invention. Accordingly, the numerous adaptations, revisions, and modifications which may be made by those skilled in the art are intended to be included within the scope of the following claims.

I claim:

1. In a brake a U-shaped cross section rotor having a mounting portion at the outboard side of said brake for supporting said rotor, an axle flange adapted to mount the rotor through said mounting portion, said rotor being positioned to extend laterally in an inboard direction from said axle flange, a brake mounting member located substantially parallel to said axle flange and disposed laterally inboard from said axle flange, a torque plate secured to said brake mounting member at the center thereof, laterally offset radial extensions of said torque plate displaced closer to the outboard side of the brake then said central portion, two spaced anchors each having one end secured to the laterally offset extensions of said torque plate and projecting axially inwardly toward the inboard side of said brake, and two brake units one mounted on each of said anchors to position the respective units between the axially spaced sides of said U-shaped cross section rotor.

2. In a brake, a rotor having a mounting portion at the outboard side of said brake for supporting said rotor and an antifriction bearing on which said mounting portion is supported, an axle flange adapted to mount the rotor through said mounting portion, said rotor being positioned to extend laterally in an inboard direction from said axle flange, a non-rotatable brake mounting member located substantially parallel to said axle flange and disposed laterally inboard from said axle flange, a torque plate secured through the central portion thereof to said brake mounting member, laterally offset radial extensions of said torque plate forming a stepped construction displaced in an outboard direction from the central portion of the torque plate to provide an open space defined between said rotor and torque plate at the radially inner portion of said torque plate, anchoring means each having one end secured to the laterally offset extensions of said torque plate and projecting axially inboard of the brake, and braking means mounted on that portion of said anchoring means which extends within the open space defined between said rotor and torque plate and proportioned to fit within the open space provided by the offset portion of said torque plate to be in substantially the same plane as the central portion of said torque plate and positioned for engagement with an opposed cylindrical surface of said rotor, said bearing being disposed substantially coplanar with the braking surface of said rotor and said anchoring means.

3. A brake mounting comprising an axle flange, a rotor mounted for rotation on a bearing member, means for securing said rotor to said axle flange, an axle housing flange surrounding said bearing and in substantially the same vertical plane as the bearing, a torque plate including a radially inner portion lying against said axle housing flange and affixed thereto, the periphery of said torque plate being laterally offset from its radially inner portion in a direction toward said axle flange to provide an open space between the radially inner portion of said flange and said rotor, anchoring means perpendicularly received in and secured to said laterally offset periphery and projecting within said open spaced and toward the inboard side of the brake, and braking means mounted on that portion of said anchoring means which extends within the open space defined between said rotor and torque plate to be axially positioned for operation into frictional engagement with said rotor, said bearing being disposed substantially coplanar with the braking surface of said rotor and anchoring means.

References Cited in the file of this patent

UNITED STATES PATENTS

| 1,693,887 | Christensen | Dec. 4, 1928 |
| 1,726,509 | Chase | Aug. 27, 1929 |
| 2,050,121 | Putch | Aug. 4, 1936 |
| 2,065,382 | Levy | Dec. 22, 1936 |
| 2,267,225 | Weeks et al. | Dec. 23, 1941 |
| 2,796,153 | Franzen | June 18, 1957 |

FOREIGN PATENTS

| 686,409 | France | Apr. 14, 1930 |
| 783,756 | France | Apr. 15, 1935 |
| 854,666 | France | Jan. 24, 1940 |
| 1,098,952 | France | Aug. 29, 1955 |
| 707,074 | Germany | June 12, 1941 |